Nov. 1, 1966   E. J. HUNTER ETAL   3,281,914
METHOD AND APPARATUS FOR ASSEMBLING VENETIAN BLINDS
Filed Aug. 21, 1964
5 Sheets-Sheet 1

INVENTORS
EDWIN J. HUNTER,
GEORGE H. STARRETT
BY Herbert E. Kidder
AGENT Nov. 1, 1966  E. J. HUNTER ETAL  3,281,914
METHOD AND APPARATUS FOR ASSEMBLING VENETIAN BLINDS
Filed Aug. 21, 1964  5 Sheets-Sheet 2

INVENTORS
EDWIN J. HUNTER,
GEORGE H. STARRETT
BY Herbert E. Kidder
AGENT

INVENTORS
EDWIN J. HUNTER,
GEORGE H. STARRETT
BY Herbert E. Kidder
AGENT

United States Patent Office 3,281,914
Patented Nov. 1, 1966

3,281,914
METHOD AND APPARATUS FOR ASSEMBLING VENETIAN BLINDS
Edwin J. Hunter and George H. Starrett, Riverside, Calif., assignors to Products Engineering Co., Riverdale, Calif., a co-partnership
Filed Aug. 21, 1964, Ser. No. 391,147
15 Claims. (Cl. 29—24.5)

The present invention relates to a method and apparatus for assembling Venetian blinds, and the primary object of the invention is to provide a new and improved method and apparatus for cutting the Venetian blind slats to length and assembling them into ladder tapes depending from a previously assembled headrail mounted on the machine, at a rate faster than any known prior machine of the same general type.

In the assembly of Venetian blinds, one of the chief factors limiting the speed of cutting metal slats and assembling them into the ladder tapes, is the maximum linear speed at which the slat stock may be driven without buckling and rebounding slightly when it hits the limit stops on the machine. When the speed of the slat exceeds about 3 feet per second, the sudden impact of the leading end of the slat against the limit stop causes it to buckle, thereby damaging the end of the slat. At the same time, any rebound of the slat from the limit stop adversely affects the accuracy of cutting the slat to the exact length required, as the length to which the slat is to be cut is measured from the limit stop to the cut-off die. If the slat stock rebounds even a fraction of an inch from the limit stop, the slat will be short by that amount, which is a serious problem inasmuch as no appreciable variation in slat length can be tolerated in the finished blind. The problem is particularly troublesome in a machine for assembling blinds of all sizes, as the inertia of a long, heavy slat is considerably greater than that of a short, light slat. Thus, a relatively fast operating speed that might be suitable for a narrow blind would cause slat damage and rebound trouble with a wider blind. Consequently, prior machines have been designed to operate at a relatively slow speed, in order to avoid these troubles with the larger blinds.

One important object of the present invention is to provide a novel and unique method of driving the slat stock, whereby a much faster operating speed is achieved than has heretofore been considered possible, yet with none of the damage or rebound trouble that has afflicted prior machines. To avoid buckling the slats, the present machine smoothly accelerates the strip from a stand-still up to a relatively high maximum velocity, and then smoothly decelerates the strip down to a relatively slow velocity just prior to impact of the leading edge of the slat against the limit stop on the machine. As a result, the impact of the slat against the limit stop is quite gentle, and there is no buckling of the slat, nor any appreciable rebound.

Another important object of the invention is to provide a machine having a new and improved slat-guiding arrangement, whereby the slat stock is guided from one edge only as it is advanced through the ladder tapes, and is held against the guiding means by gravity. This object is accomplished by tilting the machine back at an angle of about 15 degrees from the vertical, which causes the slat stock to lie back against the guiding means as it travels along the width of the machine. Among the advantages of this arrangement is that it greatly simplifies the guiding mechnaism and provides more accurate control of the strip. Since the strip is held by gravity with one edge bearing against the guiding means, there is no need for the guiding means to engage the other edge of the strip, and guidance of the strip is therefore unaffected by dimensional tolerances or other factors which sometimes give trouble with conventional strip-guiding means.

A further object of the invention is to provide a pay-off reel support for the coil of slat stock, which is entirely open on one side so that the coil can be placed on the support or removed therefrom without first removing a flange or other structural member from one side of the apparatus. This object is also achieved by tilting the pay-off reel support back about 15 degrees from the vertical, so that the coil is held by gravity against the back side of the structure, thereby eliminating the need for structural members to hold the coil in place. One advantage of this arrangement is that it permits changing coils of slat stock quickly and easily, without manipulating anything on the pay-off reel support.

Another important object of the invention is to provide a Venetian blind assembly machine in which all of the functions of the machine are accurately and positively timed with respect to one another, and in which the timing of the several functions is entirely independent of the operating speed of the machine. This object is achieved by means of an all-cam drive, in which all the functions of the machine are initiated by various cams acting against cam followers. Thus, various cams drive the slat stock through the machine, raise the blind in 1-slat increments, operate the cut-off and hole-punch dies, retract the limit stops, and bring a friction drive wheel down into driving engagement with the slat stock, all in precise operational sequence, and with each function accurately controlled to produce blinds of highest quality. Among the advantages of this all-cam drive is the fact that the machine can be speeded up for short slats, or slowed down for long, multiple cord slats, and still keep all the functions in perfectly timed relationship.

A further object of the invention is to provide a new, improved and greatly simplified lifting mechanism by which the blind is lifted in extremely accurate increments equal to the spacing between the cross-straps of the ladder tapes, and which can also be raised rapidly under power, or lowered rapidly under full control. The development of a reliable, accurate, trouble-free lift mechanism has been one of the major problems in producing a successful Venetian blind assembly machine, and the lift mechanism of the present invention is believed to be the first that has satisfactorily filled all operational requirements.

Still a further object of the invention is to provide a Venetian blind assembly machine that cuts the slats to length, and punches the cord holes therein, at the time the blind is assembled. An important advantage of this feature is that it eliminates any slat scrap, as the machine cuts exactly the number of slats desired, with no excess slats to be thrown away, and no shortage of slats necessitating the cutting of just one or two additional slats to complete a blind. Another advantage of this feature is that any error in color-matching the slats to the headrail is immediately detected when the first slat is cut and assembled into the ladder tapes, with the result that the machine can be stopped and the coil of slat stock replaced with another coil of the correct color, with the loss of only one slat.

Another object of the invention is to provide means for producing a variable braking action on the pay-off reel holding the coil of slat stock, whereby a light braking effect is applied to the pay-off reel to restrain the same from over-running when the slat stock is stopped momentarily for the cutting and punching operation; the said braking effect being approximately proportional to the diameter of the coil, so that the amount of frictional driving force required to overcome the braking resistance and accelerate the reel up to normal operating speed is not appreciably greater when the coil is almost empty than when it is almost full. This is something of a problem, owing to the fact that there is almost a 5 to 1 variation in coil diameter between a full coil and an empty coil, and a braking effect that is just right for a full coil is usually too great for an almost empty coil. With the present invention, the braking effect varies with the diameter of the coil, and therefore is uniformly effective on coils of all diameters.

Yet another object of the invention is to provide a Venetian blind assembly machine embodying a unique method and apparatus for drawing the lift cords down through the cord holes in the slats after the slats have been assembled with the ladder tapes, the said lift cords having been previously assembled in the Venetian blind headrail with the ends thereof projecting for a short distance through the bottom of the headrail between the side tapes of the ladder tapes. The lift cord passes through the cord lock and hangs downwardly therefrom at one end of the headrail, and this depending portion of the lift cord is manipulated to raise or lower the blind, and to operate the cord lock.

These and other objects and advantages of the present invention will become apparent to those skilled in the art upon consideration of the following detailed description of the preferred embodiment thereof, reference being had to the accompanying drawings, wherein:

FIGURE 13 is a sectional view taken at 13—13 in FIGURE 7;

The machine of the present invention is designated in its entirety by the reference numeral 10, and comprises two generally triangular end frames, each of which consists of upwardly converging vertical frame members 11 and 12, which are joined together by horizontal cross members 13, 14 and 15. The two end frames are connected together by horizontal frame members 16, 18, 20 and 22, together with additional bracing members which are not designated.

Figures 1, 18, 19, 20, 21, 22:
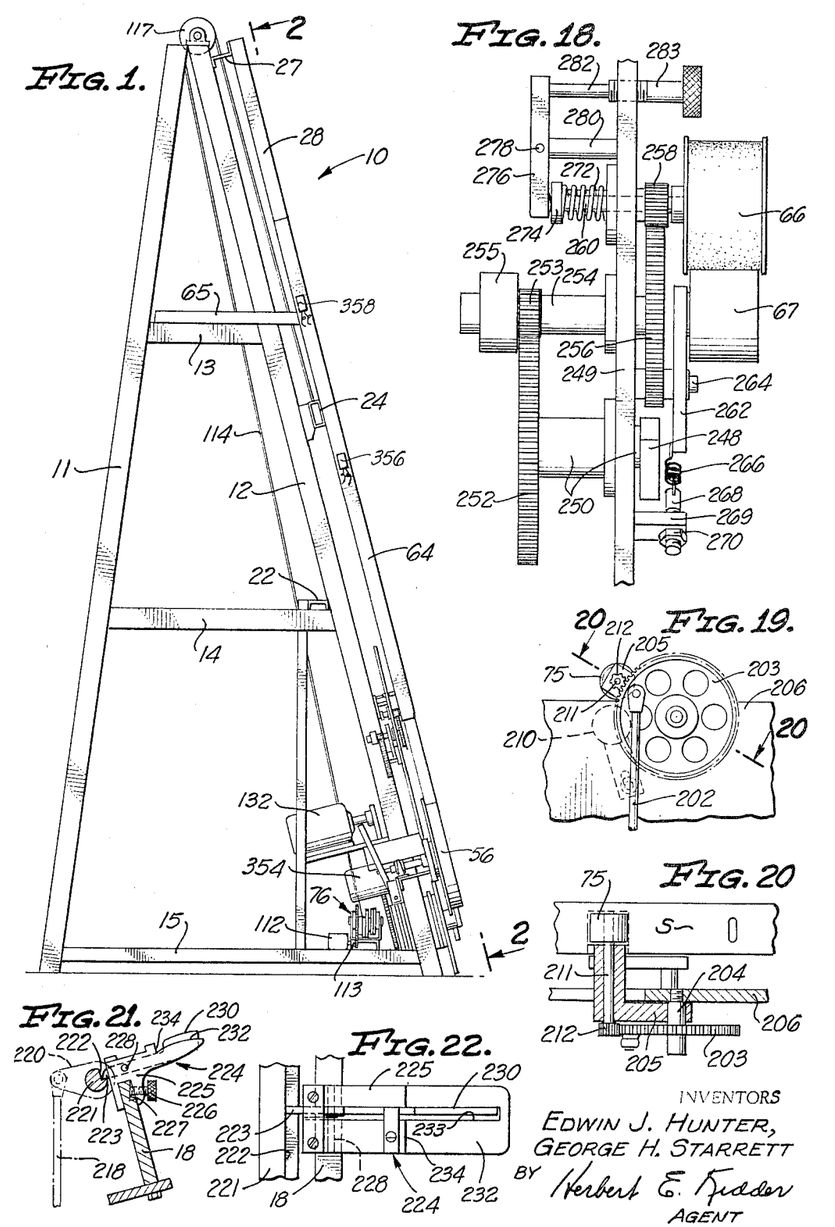
FIGURE 1 is an end view of a Venetian blind assembly machine embodying the principles of the invention.
FIGURE 18 is an enlarged detail view showing a part of the slat-driving mechanism.
FIGURE 19 is a fragmentary detail of the mechanism for advancing the finished slat into the blind.
FIGURE 20 is a sectional view taken at 20—20 in FIGURE 19.
FIGURE 21 is an enlarged fragmentary sectional view, taken at 21—21 in FIGURE 2.
FIGURE 22 is a view looking down on the part shown in FIGURE 21.

As best shown in FIGURE 1, the front side of the machine (which is to the right, in the drawings) is inclined at an angle of about 15 degrees back from the vertical, and the Venetian blind is assembled in this inclined plane, as will be explained in more detail presently. Slidably mounted for vertical movement on the two inclined frame members 12, is a horizontal headrail carrier 24, in the form of a box beam of rectangular cross section.

On the front side of the machine are two laterally spaced, vertical guide rails 26 and 28, which provide support and guidance for the ends of the Venetian blind slats as the blind is raised and lowered by the headrail carrier 24. The guide rails 26, 28 are preferably in the form of angle irons, each having one flange projecting outwardly perpendicular to the inclined plane of the front side of the machine, and the other flange extending laterally inwardly toward the oher guide rail. Guide rail 28 is stationary, and is fixedly attached at its top end by a bracket 27 to the upper end of the left-hand frame member 12. The right-hand guide rail 26 is adjustable laterally across the width of the machine so that blinds of varying widths can be received between the rails 26, 28, and for this purpose, the top end of rail 26 is slidably supported by a runner 29 (FIG. 2) on the top frame member 16, while the bottom end of the rail is slidably supported on frame member 18.

The headrail carrier 24 has two headrail-supporting brackets 30 and 30' mounted thereon, the latter being stationary, while the former is slidable along the carrier 24 with the right-hand guide rail 28. The bracket 30 has a roller 31 (see FIGS. 25 and 26) which rides on the top edge of the carrier 24, and other rollers 32, 33 and 34, which ride on three surfaces of the vertical guide member 26. Each of the brackets 30, 30' has a forwardly projecting flange 36, upon which the pre-assembled Venetian blind headrail 38 rests. The right-hand bracket 30 is thus slidable vertically along the right-hand guide rail 26, and is also movable horizontally therewith, while the weight of the right-hand end of the headrail 38 is transferred to the carrier 24 by the roller 31.

Figures 17, 25, 26, 27, 28, 29:
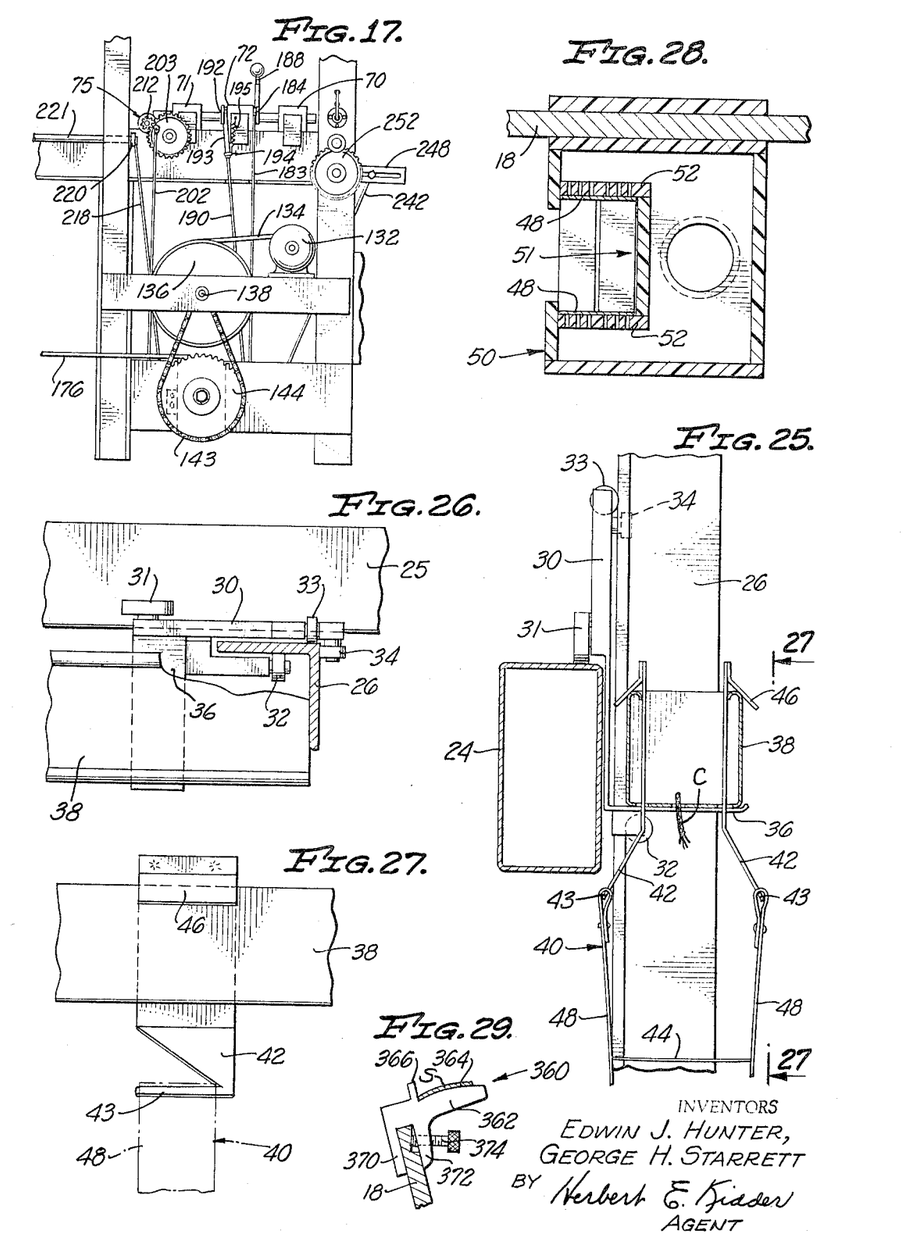
FIGURE 17 is a view of the back side of that portion of the machine shown n FIGURE 3.
FIGURE 25 is an enlarged sectional view, taken at 25—25 in FIGURE 2.
FIGURE 26 is an enlarged sectional view, taken at 26—26 in FIGURE 2.
FIGURE 27 is a side elevational view of a detail, as seen at 27—27 in FIGURE 25.
FIGURE 28 is a horizontal cross-section through one of the devices for guiding the ladder tapes and holding the sides thereof spread apart so as to facilitate the insertion of slats between them.
FIGURE 29 is a fragmentary sectional view, taken at 29—29 in FIGURE 2, showing one of the slat stock guides.

The headrail 38 is a generally square channel of sheet metal, the flat sides and bottom of which are about equal in width. The top edges of the sides are curled inwardly to stiffen them against buckling, and the bottom of the headrail is punched out at the locations of the ladder tapes and cord lock, in the usual manner. All of the Venetian blind hardware is pre-assembled into the headrail 38 before it is mounted on the machine, except for the ladder tapes 40, which are temporarily attached to the headrails by pairs of sheet metal hooks 42. Each of the hooks 42 has a horizontal finger 43 at its bottom end, which is inserted through a loop formed in the top end of the corresponding side tape 48 of the ladder 40. The cross straps, or "rungs" of the ladder are shown at 44. The top ends of the hooks 42 are provided with outwardly projecting flanges 46 which hook over the top of the headrail sides for support thereon. The lower portions of the hooks 42 are bent outwardly, as best shown in FIG. 25, so as to spread the side tapes 48 as far apart as possible.

Figures 3, 4, 30:
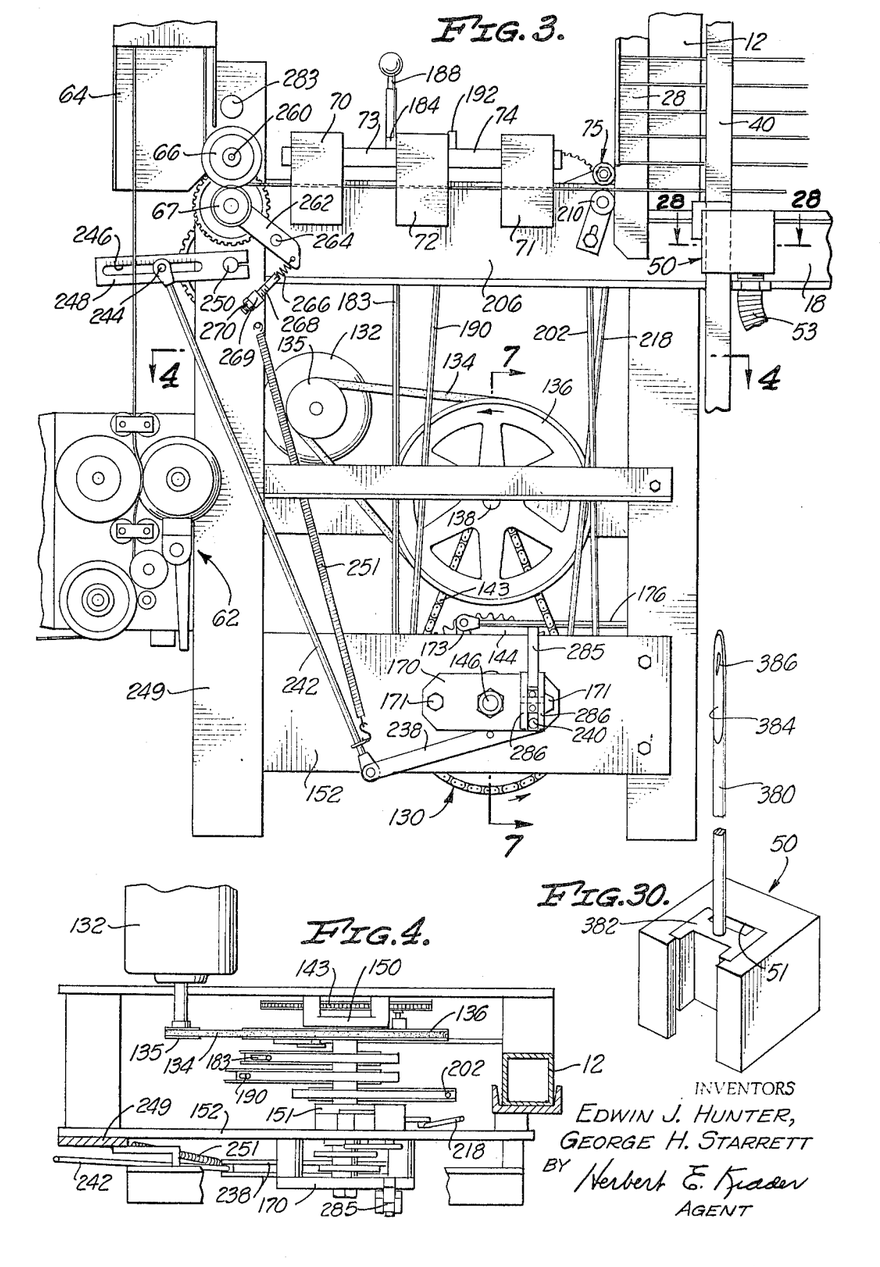
FIGURE 3 is an enlarged, fragmentary view of a portion of the machine.
FIGURE 4 is a view looking downwardly on the cam shaft of the machine, as seen from 4—4 in FIGURE 3.
FIGURE 30 is a fragmentary perspective view of one of the ladder tape guides, showing a cord-threading needle positioned therein to engage the end of the lift cord and pull the same through the cord holes in the slats and bottom rails of the assembled blind.

The ladder tapes 40 pass through guides 50 which are mounted on the cross member 18. Each of the guides 50, one of which is shown in cross-section in FIG. 28 and in perspective in FIG. 30, is a box-like structure, preferably made of plastic, and having a rectangular recess 51 in one side thereof, through which the ladder tape passes. The sides 52 of the recess 51 are perforated, and the side tapes 48 of the ladder bear against these perforated sides 52. The box 50 is made airtight, except for the perforations in the sides 52, and the interior of the box is connected by flexible hoses 53 to a vacuum pump 54, which may conveniently be taken from any commercially available vacuum cleaner. The vacuum within the box 50 causes the side tapes 48 of the ladders to be sucked flat against the sides 52 of the rectangular recess, and in this way, the side tapes 48 are drawn as far apart as the length of the cross straps 44 will allow, thereby facilitating the insertion of the slat stock between the side tapes of the ladder.

Figure 2:
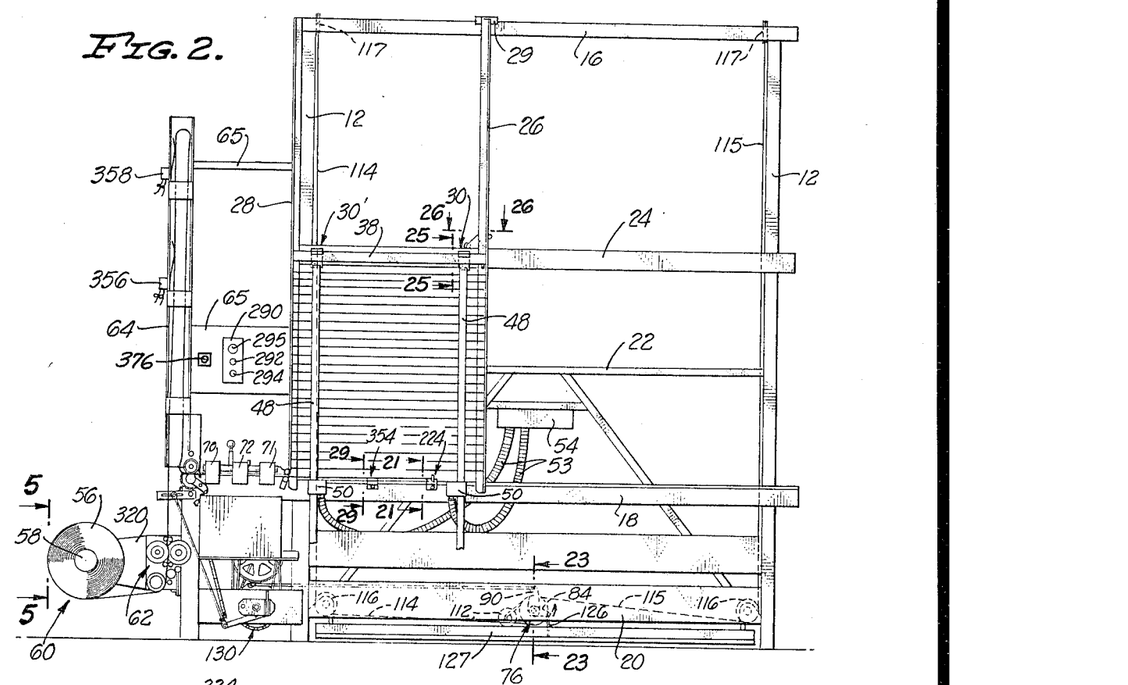
FIGURE 2 is a side elevational view of the same, as seen from 2—2 in FIGURE 1.

Mounted on the left-hand end of the machine as seen in FIG. 2, is a slat feeding mechanism with cut-off and hole-punch dies, which are actuated to cut the slats to length and punch the cord holes therein. Slat stock for the Venetian blinds is supplied in the form of a coil 56 of slightly crowned, painted metal strip, usually of aluminum alloy, which is wound on a core 58. The coil 56 is mounted on a pay-off reel support 60, and the strip is pulled off the reel and passed through forming rolls 62, which are adjustable to increase or decrease the crown, and otherwise correct for defective characteristics in the strip. The strip passes upwardly in a long loop through a slat stock accumulator 64, preferably in the form of a wide, vertical channel, which is mounted on the machine frame by means of frame members 65. At the bottom end of the accumulator 64, the strip turns 90 degrees and passes horizontally between two rollers 66 and 67, which cooperate to drive the strip along a horizontal plate across the width of the machine. The rollers 66, 67 and their driving mechanism will be described in more detail presently.

From the rollers 66, 67, the strip passes horizontally through two hole-punch dies 70 and 71, and a cut-off die 72. The hole-punch dies 70, 71 are disposed on opposite sides of the cut-off die 72, and are spaced apart equidistantly therefrom so that the cord holes punched by the dies will be spaced the desired distance from the ends of the slats. The position of the hole-punch dies 70, 71, is adjustable with respect to the cut-off die 72, and can be varied according to the size of the blind or other special requirements. The dies 70, 71 and 72 are operated by two rock-shafts 73 and 74, which are arranged end-to-end, as best shown in FIG. 3, and their abutting ends are joined together inside the housing of the cut-off die 72 in a driving connection, whereby rocking movement of the shaft 73 causes the shaft 74 to rock with it, whereas the shaft 74 can be made to rock independently of the shaft 73. The reason for this arrangement is that in a normal 2-tape blind, all three dies, 70, 71 and 72 are operated simultaneously to cut the slat stock into slats of predetermined length, with one cord hole punched in the trailing end of the slat, and another cord hole punched in the leading end of the next slat. However, for a 4-tape blind, it is necessary to punch cord holes for the lift cords of the center two ladder tapes without cutting the slat stock, and this is accomplished by operating the hole-punch die 71 independently of the other dies, while the slat is momentarily stopped at the proper position. The manner of operating the dies 70, 71 and 72 will be described in more detail presently.

After the slat has been cut to length, it is driven the last short distance into the blind by means of a friction drive wheel 75, and as the slat reaches the end of its travel, the headrail carrier 24 is raised another increment, presenting the next lower opening in the ladder tapes to receive the next slat.

The headrail carrier 24 is raised in increments equal to the spacing between the cross straps 44 of the ladder tape 40, by means of a lifting drum 76, which is mounted on the bottom of the machine about midway between its ends. The drum 76 is mounted for rotation about a horizontal axis, and has spiral grooves formed in the outer surface thereof into which cable lies as the cable is wound onto the drum. The drum 76 is mounted on a U-shaped bracket 78, the arms of which support a horizontal shaft 80 having a head 81 at one end, and a threaded end 82 at the other end. Screwed onto the threaded end 82 of the shaft is a nut 83, having a radially extending arm 84 attached thereto. The nut 83 is journaled in a bushing 85 which is pressed into one of the arms of the U-shaped bracket 78. On the other arm of the bracket, a clamping ring 86 is secured by screws to the outer face of the bracket arm, and bears against the head 81 to hold the shaft 80 against turning.

Mounted on the inner end of the nut 83 is a ball-bearing 87 which supports a clutch driving member 88. The clutch driving member 88 is part of a one-way clutch 89, and mounted on the member 88 is a radially projecting lever arm 90.

Figure 24:
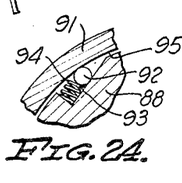
FIGURE 24 is a fragmentary detail of the one-way clutch mechanism in the lifting drum.

The driving member 88 of the one-way clutch 89 drives a driven member 91 by means of a plurality of rollers 92, each of which is confined within a wedge-shaped recess 93 in the outer surface of the driving member 88, as best shown in FIG. 24. The rollers 92 are urged toward the shallow end of the recess 93 by springs 94, and when the driving member 88 is turned in the counterclockwise direction, as viewed in FIG. 24, the roller 92 is tightly wedged in the shallow end of the recess, and bears against the inner surface 95 of the driven member 91, locking the driven member 91 to the driving member 88. This type of one-way clutch is well known in the art and is not, in itself, a part of the invention.

The outer driven member 91 of the clutch is pressed into a recess in the adjacent end of an intermediate member 96, and this intermediate member is disposed immediately alongside the end of the drum member 76 and is frictionally connected thereto by a friction clutch facing 97. The intermediate member 96 is also connected by loosefitting pins 98 to a central cylindrical member 99, which has a bore through the central axis thereof through which the shaft 80 extends. Bushings 100 are pressed onto the outer ends of the member 99, and the drum 76 turns on these bushings.

Figure 23:
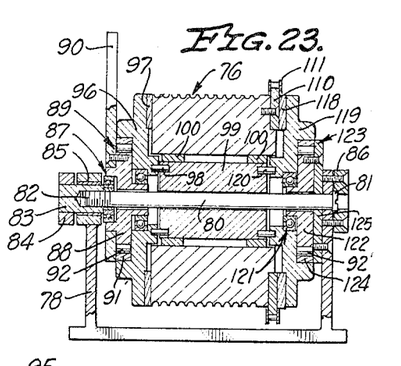
FIGURE 23 is an enlarged sectional view of the drum mechanism for elevating the headrail carrier, as seen at 23—23 in FIGURE 2.

Mounted on the right-hand end of the drum 76, as viewed in FIG. 23, is a sprocket wheel 110, around which is trained a chain 111. The chain 111 also passes around a smaller diameter sprocket on a motor 112, to which it is connected by a one-way clutch 113 (see FIG. 1). The one-way clutch 113 is arranged to transmit power from the motor 112 to the drum 76 when the direction of drive is such that cable is being wound onto the drum. At the same time, the one-way clutch 113 permits the sprocket 110 and chain 111 to overrun the motor 112 when the latter is stopped and the drum 76 is being driven by the lever arm 90, as will be explained in more detail presently.

Two cables 114 and 115 are wrapped around the drum 76 from opposite sides thereof and extend toward opposite sides of the machine frame. These cables pass under pulleys 116 at the bottom end of the end frames, and travel upwardly therefrom to the top end of the frames, where they pass over pulleys 117. From the pulleys 117, the cables 114, 115 extend downwardly to and are connected with the headrail carrier 24.

Disposed between the outer face of the sprocket 110 and the inner face of the adjacent, second intermediate member 119, is a friction clutch facing 118. The intermediate member 119 is also connected to the cylindrical member 99 by loose-fitting pins 120, so that the two intermediate members 96 and 119 turn as one with the cylindrical member 99, while the pins 98, 120 allow the intermediate members 96 and 119 a limited amount of endwise movement with respect to the member 99. When the members 96 and 119 are forcibly drawn together against opposite ends of the drum 76, the friction facings 97 and 118 are clamped tightly between them, and the drum 76 is thereby locked to the intermediate members 96 and 119, and forced to rotate therewith.

A ball-bearing 121 is pressed into a cavity in the center of the intermediate member 119, and the inner race of the bearing is seated on a cylindrical hub of an inner clutch member 122 forming one part of a one-way clutch 123. The outer member 124 of the clutch is pressed into a cavity in the outer face of the intermediate member 119, and is operatively connected to the inner member by rollers 92′, which are essentially the same as those described in connection with the one-way clutch 89. The inner clutch member 122 is connected by screws to a stationary member 125, and the latter is attached by screws to one arm of the U-shaped bracket 78. The outer end of the lever arm 84 is connected by a link 126 (see FIG. 2) to a foot treadle 127 extending across the width of the machine.

When the operator presses downwardly on the foot treadle 127, the nut 83 is turned in the direction to back off on the threads 82, and this relaxes the end pressure exerted against the intermediate members 96 and 119. With the relaxation of pressure tending to press these members tightly against the end of the drum 76, the frictional force against the clutch facings 97 and 118 becomes relatively small, and the drum 76 is released from the intermediate members 96 and 119. This allows the drum to turn freely, as the headrail carrier 24 with the Venetian blind headrail mounted thereon descends along the guide rails 12. The rate of descent of the headrail carrier is checked by the drag of the electric motor 112 which is driven by the sprocket 110 and chain 111.

The operation of the lifting drum 76 and all of the other operating mechanisms of the machine is effected by means of a cam assembly 130, which is mounted at the left-hand end of the machine, as viewed in FIG. 2. The cam assembly 130 is driven by variable speed electric motor 132 through a V-belt 134. The belt 134 is trained around a small-diameter V-belt pulley 135 on the motor shaft, and around a large-diameter pulley 136, which is mounted on the projecting end of a short shaft 138 that is rotatably supported by two laterally spaced structural members 140 (see FIG. 7). Mounted on the shaft 138 between the frame members 140 is a small-diameter sprocket wheel 142, around which is trained a chain 143. The chain 143 is also trained around a large-diameter sprocket 144 which is mounted on the projecting outer end of a cam shaft 146. The sprocket wheel 146 is connected to the shaft 126 by two friction clutch disks 148, which clamp against the opposite sides of the sprocket 144.

The cam shaft 146 is rotatably supported on three laterally spaced frame plates 150, 151 and 152, which are joined together by two laterally spaced bolts 154 and 155. Mounted on the cam shaft 146 between frame plates 150 and 151 are cams 160, 161, 162 and 163. These cams are spaced apart from one another by suitable spacers, and all of the cams are keyed to the shaft 146 by a spline 164, which is seated within a narrow slot extending longitudinally along one side of the shaft.

Mounted on the shaft 146 between the frame plates 151 and 152 is a cam shaft stopping device 165, the purpose of which is to stop the cam shaft each time at a particular point when the machine is shut off, as will be explained in more detail presently. The cam shaft 146 projects forwardly from the front face of the plate 152, and mounted on this projecting portion of the cam shaft between the plate 152 and a smaller plate 170, are three cams 166, 167, and 168. The plate 170 is secured to the plate 152 by two laterally spaced screws 171 (see FIG. 3).

Figures 7, 8, 9, 10, 11, 12, 14:
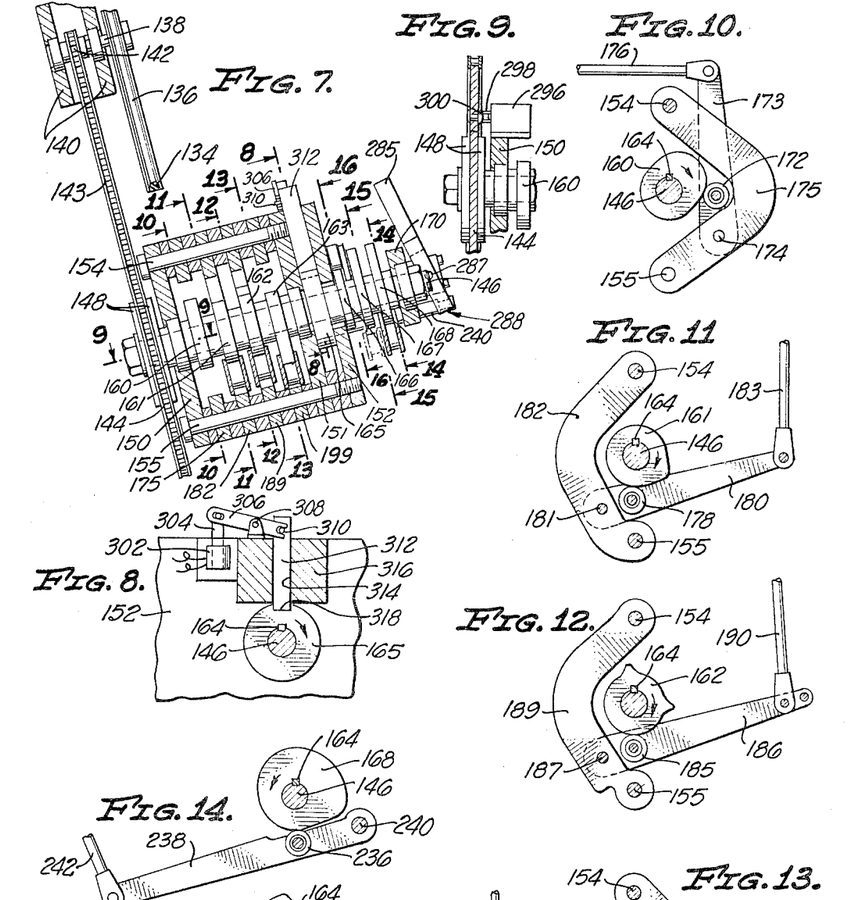
FIGURE 7 is a sectional view taken at 7—7 in FIGURE 3.
FIGURE 8 is a fragmentary sectional view taken at 8—8 in FIGURE 7.
FIGURE 9 is a fragmentary sectional view taken at 9—9 in FIGURE 7.
FIGURE 10 is a sectional view taken at 10—10 in FIGURE 7.
FIGURE 11 is a sectional view taken at 11—11 in FIGURE 7.
FIGURE 12 is a sectional view taken at 12—12 in FIGURE 7.
FIGURE 14 is a sectional view taken at 14—14 in FIGURE 7.

The several cams mounted on the shaft 146 perform all of the operating functions of the machine, and these functions will now be described. Cam 160, which is best shown in FIG. 10, is the lift cam that operates the drum 76, which raises the headrail carrier 24. Riding on the perimeter of the cam 160 is a cam follower wheel 172, which is journaled on a lever arm 173. The lever arm 173 is swingably supported at its bottom end on a pivot pin 174, which is anchored in a boomerang-shaped support member 175, the ends of which are held by the bolts 154 and 155. One end of a push-rod 176 is connected to the top end of lever arm 173, and the other end of the push-rod is connected to the lever arm 90 on the lifting drum 76. Preferably, the lever arm 173 comprises two laterally spaced bars which pass on either side of the support member 175, and cam follower wheel 172 is disposed between them.

The lift cam 160 is a harmonic-motion cam, which is designed to accelerate the cam follower 172 through one-half of its lift, and to decelerate through the remaining half of the lift. The smooth acceleration and deceleration of the lift of the cam 160 results in a smooth, shockless start and stop for the headrail carrier 24, while at the same time achieving a fairly high maximum velocity at the midpoint of the lift. The cam shaft 146 and cam 160 turn in the clockwise direction, as viewed in FIGURE 10, and the cam follower 172 is shown about half way up on the front side of the cam lobe, which means that the lever arm 173 is being swung over to the right in the clockwise direction. As the cam follower 172 rides down on the back side of the cam lobe 160, the lever arm 173 swings back over to the left, and during this direction of travel, the lever arm 90 is being rocked back with respect to the drum 76, to pick up the latter on the next stroke. While the lever arm 90 is being rocked backwardly, the one-way clutch 123 prevents the drum 76 from following the lever arm.

The next cam 161, which is shown in FIG. 11, operates the cut-off die 72 and hole-punch dies 70 and 71. Riding on the perimeter of the cam 161 is a cam follower 178, which is journaled on a lever arm 180. One end of the lever arm 180 is swingably connected to another boomerang-shaped support member 182, by pivot pin 181, and connected to the other end of the arm 180 is an upwardly projecting operating rod 183. The top end of the operating rod 183 is connected to a lever arm 184, fixed to shaft 73 and projecting rearwardly therefrom. Each time the lever arm 180 is pushed downwardly by the cam 161, the operating rod 183 pulls the lever arm 184 downwardly, which rocks both of the rock shafts 73 and 74 simultaneously, causing all three of the dies 70, 71 and 72 to be operated simultaneously, thereby cutting the slat stock to predetermined slat length, and at the same time punching the cord holes at the rear end of one slat and at the leading end of the next. A manually operable handle 188 on the shaft 73 enables the operator to operate the three dies 70, 71 and 72 manually, if desired.

Cam 162, shown in FIG. 12, is a two-lobe cam which operates the hole-punch dies 71 independently of the other two dies 70 and 72, to punch two intermediate cord holes in the mid-portion of the slats for a 4-cord blind. A cam follower 185 rides on the perimeter of the cam 162, and follower 185 is journaled on a lever arm 186, one end of which is swingably connected by a pivot-pin 187 to a support member 189. An operating rod 190 is connected to the other end of the lever arm 186, and extends upwardly therefrom. At its upper end, rod 190 is connected to a lever arm 192 (see FIG. 17), which is fixed to and projects rearwardly from the rock shaft 74 that operates the hole-punch die 71. Each time the lever arm 186 is swung downwardly by the cam 162, the downward pull of the operating rod 190 causes the hole-punch die 71 to operate independently of the other two dies 70 and 72, which is necessary for punching the cordholes in the middle portion of a 4-cord blind. Since the function of the operating rod 190 is needed only for 4-cord blinds and not for the more common 2-cord blinds, there is a provision for effectively disconnecting the rod from the operating lever 192. To this end, the top end of the rod 190 is telescoped within a tubular fitting 193 and is freely slideable therein. The fitting 193 is connected to the operating lever 192, and the rod 190 can be locked to the tubular fitting 193 by means of a set-screw 194 when it is desired that the hole-punch die 71 be actuated by the connecting rod 190. A spring 195 holds the tubular fitting up when it is disconnected from the rod 190.

The next cam 163, shown in FIG. 13, is a cut-slat feed cam, which operates to bring the drive wheel 75 down against the end of the slate and drives the wheel to advance the cut slat the last few inches into the blind. It will be noted in FIG. 3 that the driving wheel 75 is located just short of the left-hand end of the slat in the assembled blind, so that the cut slat can be driven all the way into the blind. A cam follower 196 rides on the perimeter of the cam 163, and this follower is journaled on a lever arm 200, which is swingably supported at one end by a pivot pin 201 on a support member 199. The other end of the lever arm 200 is connected to the bottom end of an operating rod 202, and the top end of the operating rod is connected to a gear 203 at a point spaced radially outward from the center of rotation thereof.

As best shown in FIGURES 19 and 20, the gear 203 turns on a shaft 204, which extends through one end of an arm 205, and is screwed into a tapped hole in a horizontal frame member 206. The arm 205 is also swingable about the shaft 204, and is pulled downwardly by the gear 203 when the latter is turned in the counterclockwise direction, as viewed in FIG. 19, thereby bringing the driving wheel 75 down against the top surface of the slat S. The slat S is supported from below by an idler wheel 210. When the driving wheel 75 closes against the slat stock, the arm 205 stops, and the gear 203 turns relative to the arm. Journaled in the outer end of the arm 205 is a shaft 211 having a pinion 212 on one end thereof, which meshes with the gear 203. There is a certain amount of frictional resistance between the shaft 211 and its bearing, and it is this resistance which causes the arm 205 to turn with the gear 203. When the arm 205 is prevented from moving with the gear 203, as when the driving wheel 75 is against the slat S, the gear 203 turns relative to the arm, and this drives the pinion 212.

The driving wheel 75 is fixedly mounted on the other end of the shaft 211 and turns with the latter when the pinion is driven by the gear 203. Because of the very small diameter of the pinion 212 as compared with the diameter of the gear 203, a small angular movement of the gear 203 is enough to cause the driving wheel 75 to make several complete turns, and this is sufficient to drive the cut slat the last 10 inches into the blind after the slat has been cut from the slat stock. On the upward stroke of the operating rod 202, the gear 203 is rotated in the clockwise direction, which causes the driving wheel 75 to be lifted immediately from its contact with the idler wheel 210.

Figures 15, 16:
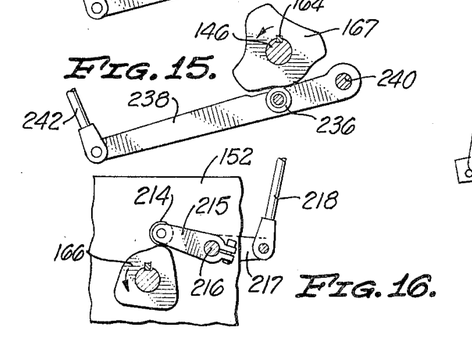
FIGURE 15 is a sectional view taken at 15—15 in FIGURE 7.
FIGURE 16 is a sectional view taken at 16—16 in FIGURE 7.

Cam 166, shown in FIG. 16, is a 3-lobe cam, having a follower 214 riding on the perimeter thereof. The cam follower 214 is journaled on one end of a lever arm 215, and its other end is clamped to one end of a shaft 216. The shaft 216 extends through and is supported for rotation in frame plate 152, and on the end projecting from the back side thereof, is a lever arm 217 having an operating rod 218 connected to the free end thereof. The operating rod 218 extends upwardly from the lever arm 217 and is connected at its upper end to a lever arm 220, which is fixed to and projects rearwardly from a rock shaft 221 (see FIG. 21). The rock shaft 221 extends across the width of the machine immediately behind the frame member 18, and is rotatably supported thereon by bearings (not shown).

Formed in one side of the rock shaft 221 and extending lengthwise thereof, is an angular groove 222, which receives one end of a lever 223. The lever 223 is the operating part of a combined limit stop and guide 224, of which there may be three to a machine, although only one of these limit stops will be used for a 2-cord blind. The other two limit stops 224 are used in making a 4-cord blind, in which case the limit stops are set up on the machine to stop the slat stock at the proper points, to enable the hole-punch die 71 to punch the cord holes in the mid-portion of the slats.

Each of the limit stops 224 comprises a base 225, which is adjustably mounted on the top edge of frame member 18, and is secured thereto by a clamping screw 226. The base 225 is provided with a downwardly opening slot which receives the top edge of the member 18, and the end of the clamping screw 226 seats on an angular groove 227 in the front side of the member 18, which prevents the housing 225 from slipping off the edge of the member 18. The lever arm 223 is pivoted at 228 on the base 225, and projecting upwardly from the front end of arm 223 is a stop plate 230, which projects upwardly from an arcuately curved slat rest 232. The lever arm 223 is disposed within a narrow, vertical slot 233 (FIG. 22) in the base 225, and the stop plate 230 is normally retracted down into the slot to allow the slat stock to slide over the slat rest 232. Each time the follower 214 drops down from one of the three lobes on the cam 166, the operating rod 218 is pushed upwardly, rocking the shaft 221 in the clockwise direction, as viewed in FIG. 21. This clockwise rocking movement of the shaft 221 causes the lever arm 223 to rock in a counter-clockwise direction, and this causes the stop plate 230 to be raised above the slat rest surface 232 to engage the end of the slat. A shoulder 234 at one end of the slat rest 232 is slidably engaged by the lower edge of the slat as the latter is advanced over the slat rest, thereby guiding the slat along its path.

Cam 167, shown in FIG. 15, is a 3-lobe cam for driving the slat stock in three separate stages, with stops in between, when making a 4-cord blind. A cam follower wheel 236 rides on the perimeter of cam 167, and this follower is journaled for rotation on a lever arm 238 which is swingably supported at one end on a pivot shaft 240. The other end of the lever arm 238 has an operating rod 242 connected thereto, and rod 242 extends upwardly and at an angle to the left, as shown in FIG. 3. The upper end of the operating rod 242 has a sliding pivot 244 mounted thereon which is slidable along the length of a slot 246 extending lengthwise of a lever arm 248. The lever arm 248 is clamped to a shaft 250, which extends through and is rotatably supported on a vertical frame member 249. A spring 251 is connected to the bottom end of the operating rod 242, and exerts an upward pull on the latter so as to hold the follower 236 against the cam.

Mounted on the back end of the shaft 250 is a large diameter gear 252, which meshes with a small diameter pinion 253 that is rotatably supported on a shaft 254. The pinion 253 is connected to the shaft 254 by a one-way clutch 255, which allows the shaft 254 to be driven only in the forward direction by the gear 252. The shaft 254 extends through and is rotatably supported by the frame member 249, and mounted on its forwardly projecting end is a large diameter gear 256 which meshes with a small diameter pinion 258 on the shaft 260. The shaft 260 is rotatably supported on the member 249, and mounted on the front end of the shaft is a friction wheel 66 which cooperates with idler wheel 67 to drive the slat stock across the width of the machine.

The idler wheel 67 is journaled on one end of a lever arm 262, which is pivoted intermediate its ends on shaft 264. The other end of the lever arm 262 has spring 266 attached thereto, and the spring is connected to an anchor screw 268 which passes through a lug 269 on frame member 249. The anchor screw 268 is adjustably secured to the lug 269 by a nut 270.

The friction wheel 66 has flanges on both ends thereof, and is preferably faced with a rubber-like tread which grips the surface of the slat stock and is thus enabled to drive the latter through the machine. The friction wheel 66 is adjustable axially for the purpose of correcting any tendency of the slat stock to move off to one side or the other. To this end, the shaft 260 is slidable axially in its bearing, and is urged toward the left as viewed in FIGURE 18, by a spring 272. The spring 272 bears at its outer end against a head 274 on the end of the shaft 260, and the outer face of the head 274 is engaged by one end of a lever arm 276. The lever arm 276 is pivoted at 278 on a post 280, and the other end of the lever arm is engaged by the stem 282 of an adjusting screw 283. The adjusting screw 283 is threaded through the frame member 249, and when the screw is turned in, the shaft 260 with the friction wheel 66 is shifted outwardly, or to the right, as seen in FIG. 18. In like manner, turning the screw 283 out allows the spring 272 to shift the friction wheel 66 toward the left. These adjustments enable the operator to regulate the path of the slat stock as it travels along the face of the machine.

Cam 168, shown in FIG. 14, is the slat stock driving cam used for making 2-cord blinds, and is also adapted to be engaged by follower 236 on lever arm 238. Accordingly, the lever arm 238 is shiftable from one to the other of the two cams 167, 128, and for this purpose, the shaft 240 is slidable endwise and is moved from one position to the other by a shifting lever 285. The shifting lever 285 is disposed between two side plates 286, which project outwardly from the outer plate 170, and is attached thereto by a pivot 287. The lower end of the shifting lever has a fork 288 with trunnions (not shown) thereon which ride in a circumferential groove in the projecting end of shaft 240. Thus, to shift the lever arm 238 and cam follower 236 from one of the cams 167, 168 to the other, the shifting lever 285 is merely moved from one position to the other, which shifts the pivot shaft 248 and carries the lever arm 238 with it.

Each of the cams 167 and 168 has its lobes contoured to lift the follower 236 with a smoothly accelerated rate of lift, followed immediately by a smoothly decelerated rate of lift, which terminates in a short portion of uniform rate of lift. At the end of the lift, the cam lobes are contoured to lower the follower rapidly to its initial starting point. This acceleration and deceleration of the cam follower results in a corresponding acceleration and deceleration of the friction drive wheel 66, inasmuch as the latter is connected by gears and mechanical linkage to the cam follower. Each of the large diameter gears 252 and 256, driving small diameter pinions 253 and 258, causes a very large multiplication of travel. The result is that a relatively small angular travel of the arm 248 causes the friction wheel 66 to turn through several revolutions, thereby driving the slat stock for a considerable distance and at a high linear speed. At the same time, the rate of acceleration and deceleration of the cam follower 236 on either of the cams 167 or 168, is faithfully reproduced by corresponding rates of acceleration and deceleration of the slat, and during the period when the follower 236 is being lifted at a uniform velocity, the slat stock is being driven at a speed of the general order of 3 feet per second, just prior to impact of the leading end of the slat against the limit stop.

The amount of angular travel of the lever arm 248 is governed by the position to which the sliding pivot 244 is adjusted along the slot 246. The closer the pivot 244 is to the shaft 250, the greater the amount of angular travel of the arm 248 for each stroke of the operating rod 242. Thus, when the pivot 244 is at the outer extremity of the slot 246, the arm 248 swings through the minimum of angular distance for each stroke of the rod 242, and conversely, when the pivot 244 is at the inner end of the slot, the angular distance is the maximum.

Due to the high linear velocity achieved by the slat stock at the midpoint between starting and stopping, the average time required to insert a slat into the blind is greatly reduced below the average time required by the conventional machine using a constant linear velocity of slat travel. The lifting cam 160 is likewise contoured to provide an accelerated and then decelerated action on the lift drum 76, so that the headrail is elevated at a faster average speed than can be attained with a conventional machine in which the lift is done at a constant velocity.

Mounted on the crosspiece frame member 65 is a control box 290, having a "start" button, "stop" button 294, and motor speed-control knob 295. The start and stop buttons 292 and 294 are connected into the electrical circuit of the machine and function to start and stop the electric motor 132. When the stop button 294 is pressed, the circuit to the motor 132 is opened, but inertia of the moving parts causes the machine to coast for a short period of time, making it difficult to stop the machine at a precise point. Ideally, the machine should stop at the precise instant that the last slat is cut and advanced into the blind. The present machine is caused to stop in this manner by means which will now be described.

Mounted on the member 150, as shown in FIG. 9, is a snap-action switch 296, having an actuating control button, or lever, 298, which is engaged and depressed by a cam button 300, projecting from one side of the sprocket 124. The switch 296 is connected to a relay (not shown) which is opened when the stop button 294 is pressed. The said relay continues to send current to the switch 296 and thence to a holding coil 302 (see FIG. 8) until the switch 296 is opened by the cam button 300; at which point the circuit to the holding coil is opened, and the holding coil is de-energized. The holding coil 302 has an armature 304 which is connected to a lever arm 306, and the latter is pivoted intermediate its ends on a pin 308. The other end of the lever arm 306 is forked to engage a pin 310 projecting laterally from a locking dog 312, which is slidably disposed within a bore 314 provided in a housing 316. The housing 316 is mounted between the frame 151, 152, and the lower end of the locking dog 312 projects below the bottom of the housing 316 and is adapted to drop into a notch 318 in the outer surface of the circular locking member 165. Thus, when the stop button 294 is pressed, the electric motor 132 is shut off immediately, but the machine continues to coast until the switch 296 is opened by the cam button 300. At this point, the locking dog 312 is dropped into the notch 318 in the member 165, and this stops the cam shaft 146 at the same point each time. In the event that the motor 132 is still turning at an appreciable speed when the locking dog 312 drops into the notch 318, the friction plates 148 cushion the shock by slipping and allowing the sprocket wheel 144 to turn on the shaft 146.

Figure 5:
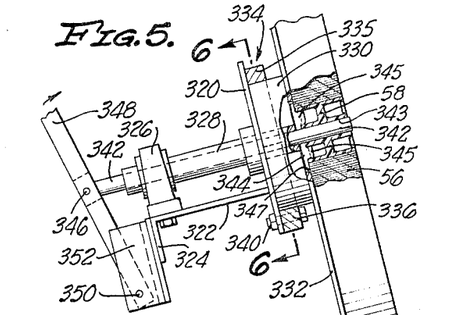
FIGURE 5 is a view of the pay-off reel support, as seen from 5—5 in FIGURE 2.
Figure 6:
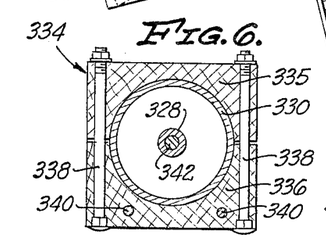
FIGURE 6 is a sectional view taken at 6—6 in FIGURE 5.

Among the advantageous features of the present machine is the novel construction of the pay-off reel support 60, which holds the coil 76 of slat stock from which the Venetian blind slats are cut. The support 60 comprises a base plate 320, which is attached to the frame member 249 through the intermediary of the forming roll mechanism 60. The base plate 320 projects laterally from the machine in the inclined plane of the front side thereof, and, as best shown in FIG. 5, is inclined back from the vertical about 15 degrees. Welded perpendicularly to the back side of the base plate is a platform 322, having a downwardly turned flange 324. A self-aligning bearing 326 is mounted on the outer edge of the platform 322, and journaled within this bearing is a tubular shaft 328. The shaft 328 extends through a hole (not shown) in the member 320, and is attached at its front end to a flat, circular, supporting plate 332, against which the coil of slat stock lies. Bolted to the back side of the plate 332 is a brake drum 330, which is cradled within a brake 334. The brake 334 comprises a top shoe 335 and a bottom shoe 336, both preferably of wood, which are joined together by two bolts 338. The bottom shoe 336 is bolted to the base plate 320 by two laterally spaced bolts 340, and the brake 334 is thus held stationary, while the drum 330 revolves with the plate 332 supporting the coil 56 of slat stock.

Slidably disposed within the tubular shaft 328 is a spindle 342, the ends of which project beyond the ends of the shaft. The front end of the spindle 342 extends into a cylindrical bore 343 in the center of the core 58, upon which the coil 56 of slat stock is wound. A cross bar, 344, which extends diametrically through the spindle 342 just behind the plane of the front face of the flat plate 332, has wings 345 which project into the end of the core 58 and engage the back sides of two diametrically opposite stiffening spokes in the core, to provide a driving connection between the core and the spindle 342. The cross bar 344 is also received within a slot 347 in the plate 332, and its ends project radially outwardly beyond the core 58 for a short distance, to engage the inner turns of the coil.

The rear end of the spindle 342 is engaged by a shifting fork 346 on a lever 348, which is pivoted at 350 on a bracket 352 mounted on the back side of the flange 324. When the lever 348 is swung over to the right, as viewed in FIG. 5, the spindle 342 and crossbar 344 push the coil 56 away from the flat supporting plate 332, making it possible to grasp the coil to remove the same from the pay-off reel support.

The interlocking engagement of the crossbar 344 with the core 58 causes the plate 332, drum 330 and shaft 328 to rotate with the coil. The drum 330 is cradled in the bottom half 336 of the brake 334, and the latter therefore exerts a braking torque on the rotating assembly, which tends to restrain the free rotation of the coil. This braking torque on the coil 56 is necessary because the coil is started and stopped intermittently by the forming roll assembly 62, which is driven by its own motor 354. The motor 354 is started and stopped by two vertically spaced limit switches 356 and 358, mounted on the left-hand side of the slat stock accumulator 64, each of which is actuated by the strip within the accumulator 64. The two switches 356, 358 are both normally closed, and are connected in series with one another and with the circuit of the motor 354. As the loop of slat stock climbs up the accumulator 64 and passes the lower switch 356, the pressure of the loop against the switch-actuating member in the accumulator causes the switch to open, which shuts off the motor 354. However, the motor continues to coast, and in so doing the loop of slat could climb to a height above the switch 356 such that the pressure of the slat stock would no longer be able to hold the switch open, and the motor 354 would start up again. To prevent this, the second switch 358 is positioned where it will be opened by the loop of slat stock as the latter climbs during the coasting period of the motor, and the opening of this second switch 358 is insurance against the motor starting up again if switch 356 should close.

To prevent the coil 56 from coasting after the forming rolls 62 have stopped, thereby spilling slat stock onto the floor, a braking torque is applied to the coil by the brake 334. A heavy, full coil has greater inertia than a light, empty coil, and the former therefore requires a greater braking torque than the latter. Since there is a long moment arm between the outer surface of a full coil and its center of rotation, there is no particular problem in overcoming this high braking torque by pulling on the strip where it comes off the reel. However, if a constant braking torque sufficient to control the inertia of a full coil is applied to the coil by the brake 334 when there is a light almost empty coil on the pay-off reel support, the very short moment arm of the small diameter coil, with its reduced mechanical advantage, would require a much greater pull on the strip to overcome the braking torque.

The spread in diameter between a full coil and an empty coil is of the order of five to one, which means that the mechanical advantage is of the same order. Thus, in an almost empty coil, there is only about one-fifth the mechanical advantage that there is in a full coil, and the pull on the slat stock would have to be almost five times as great. With the present invention, this problem is obviated by the novel braking assembly 330, 334, in which the pressure of the brake drum 330 against the bottom shoe 336 of the brake is proportional to the weight of the coil 56. Thus, with a full coil, there is a considerably greater weight carried on the pay-off reel support, and the brake drum 330 exerts a considerably greater pressure against the shoe 336, resulting in a relatively high braking torque. On the other hand, a relatively small coil 56, which is only a fraction of the weight of a full coil, causes the brake drum to press with considerably less pressure against the shoe 336, thereby producing a much smaller braking torque. Thus, the braking torque is proportional to the size of the coil, and varies substantially in direct proportion to the mechanical advantage in pulling the slat stock off the coil, which is a function of the diameter.

As the slat stock is driven across the width of the machine, it is guided by one or more inclined slat stock guides 360, one of which is shown in FIG. 29. The slat stock guide 360 comprises a body 362, having an arched slat rest surface 364 on its top side, which is contoured to conform to the crown of the slat S. Projecting upwardly from the body 362 on the lower sides of the inclined surface 364 is a guide flange 366, which is slidably engaged by the lower edge of the slat S. Two laterally spaced mounting flanges 370 and 372 project downwardly from the body 362 adjacent the back edge thereof, and are adapted to straddle the frame member 18. A clamping screw 374 secures the guide 360 to the member 18, and this arrangement enables the guide to be adjustably secured to the member 18 at any position along the length thereof. The guide 360, being tilted back at an angle of about 15 degrees, cause the slat S to drop down against the bottom guide flange 366, and the strip is therefore guided entirely from the lower edge thereof.

The operation of the invention is as follows. A pre-assembled headrail 38 is mounted on the headrail carrier 24 with the ladder tapes 48 attached to the headrail by hooks 42 and hanging downwardly therefrom. The ladder tapes 48 are placed within the rectangular recesses 51 in the ladder tape guides 50, and the headrail carrier 24 is lowered to its extreme lowermost position. The machine is then started up, and slat stock is withdrawn from the coil, cut into slats of predetermined length, cord holes are punched in the slots, and the finished slates are fed into the ladder tapes. As each finished slat is inserted all of the way into the blind, the headrail carrier is raised another increment, presenting the next lower cross tape of the ladders to receive the next lower slat. As the last slat is inserted into the ladder tapes, the machine is stopped; a bottom rail having cord holes punched therein is inserted into the bottom rungs of the ladder tapes, and the completed blind is raised to an elevated position by closing a switch 376 on frame member 65 (see FIG. 2) which operates the motor 112 of the lifting drum.

Threading needles 380 are then inserted into the ladder tape guides 50, and for this purpose, the threading needle 380 is provided with an H-section base, which is snugly received within the rectangular recess 51 of the ladder tape guide. The top end of the needle 380 has a channel 384 formed in one side thereof, into which the lift cord is pressed. A downwardly projecting needle 386 is secured to the bottom of the channel near the tip end of the threading needle 380, and this needle 386 hooks into the cord to attach the cord to the threading needle 380. The operator lowers the assembled blind by depressing the foot treadle 127, which releases the lifting drum 76 and allows the headrail carrier 24 to descend by gravity. As the headrail carrier and assembled blind descend, the threading needles pass upwardly through the cord holes in the slats. When the top ends of the needles are in the space between the top slat and the bottom of the headrail, the descent of the headrail carrier 24 is checked by releasing the treadle 127, and the ends of the lift cords are attached to the threading needles, by pressing the cord into the channel 384 and hooking it onto the needle 386. The headrail carrier is now raised by power until the top ends of the threading needles clear the bottom rail, or alternatively, the threading needles 380 may be removed from the rectangular recesses 51 and pulled downwardly through the slots. Either way, the ends of the cords C are now removed from the threading needles and are knotted or otherwise secured to prevent them from being pulled up through the bottom rail. The lift cord is then pulled down to accumulate the slats against the underside of the bottom rail, and the finished blind is removed from the headrail carrier 24 for final finishing touches.

While we have shown and described in considerable detail what we believe to be the preferred form of our invention, it will be understood by those skilled in the art that various changes may be made in the shape and arrangement of the several parts without departing from the broad scope of the invention as defined in the following claims.

We claim:

1. A venetian blind assembly machine for cutting metal slats to length from a coil of slat stock, punching cord holes in said slats, and assembling said slats into ladder tapes depending from a preassembled headrail, said machine comprising:
   a frame structure having laterally spaced, generally vertical guide means;
   a headrail carrier mounted on said guide means for vertical sliding movement, said carrier having means for holding said headrail in a horizontal position;
   means for raising said headrail carrier in increments equal to the vertical spacing between cross straps on said ladder tape;
   means for supporting said coil of slat stock so that the slat stock can be fed into the machine along a path below said headrail and parallel thereto;
   means for holding said ladder tapes with the sides thereof spread apart to the maximum width to receive said slats between them;
   means on said machine for cutting said slat stock into individual slats of predetermined length, and for punching cord holes in said slats prior to inserting a limit stop mounted on said frame in the path of said the slats into said ladder, tapes;
   slat stock and engageable by the leading end thereof to stop said slat stock while the same is cut to length and cord holes are punched therein; and
   driving means engageable with said slat stock for smoothly accelerating the same up to a relatively high linear velocity and then smoothly decelerating the slat stock down to a much slower linear velocity just prior to the impact of the leading end thereof against said limit stop, whereby the velocity of the slat stock at the instant of impact is below the velocity at which damage to the slat occurs.

2. A venetian blind assembly machine for cutting metal slats to length from a coil of slat stock, punching cord holes in said slats, and assembling said slats into ladder tapes depending from a preassembled headrail, said machine comprising:
   a vertically movable headrail carrier having means for holding a headrail in the horizontal position;
   means for raising said headrail carrier in increments equal to the vertical spacing between cross straps on said ladder tape;
   a rotatable friction wheel engaging said slat stock to drive the same along a path below said headrail and parallel thereto;
   means for guiding the slat stock through said ladder tapes as the said slat stock is advanced by said friction wheel;
   a limit stop disposed in the path of said slat stock and engageable by the leading end thereof to stop said slat stock while the same is cut to length and cord holes are punched therein;
   means on said machine for cutting said slat stock into individual slats of predetermined length, and for punching cord holes in said slats;
   a motor-driven cam; and
   means actuated by said cam for driving said friction wheel whereby said slat stock is smoothly accelerated up to a relatively high linear velocity and is then decelerated down to a much slower linear velocity just prior to the impact of the leading end thereof against said limit stop, the velocity of the slat stock at the instant of impact being below the velocity at which damage to the slat occurs.

3. A Venetian blind assembly machine for cutting metal slats to length from a coil of slat stock, punching cord holes in said slats, and assembling said slats into ladder tapes depending from a pre-assembled headrail, said machine comprising:
   a vertically movable headrail carrier having means for holding a pre-assembled headrail in a horizontal position;
   means for raising said headrail carrier in increments equal to the vertical spacing between cross straps on said ladder tape;
   a rotable friction wheel engaging said slat stock to drive the same along a path below said headrail and parallel thereto;
   guide means for guiding said slat stock through said ladder tapes as it is advanced by said friction wheel;
   cut-off means on said machine for cutting said slat stock into individual slats of predetermined length;
   hole punch means for punching cord holes in said slats;
   a limit stop mounted on said frame in the path of said slat stock and engageable by the leading end thereof to stop said slat stock while the same is cut to length and cord holes are punched therein;
   a motor-driven cam shaft having a plurality of cams mounted thereon, each of said cams having a follower;
   a driving connection between one of said cam followers and said friction wheel, whereby the latter is caused to rotate by the movement of said cam follower along the contour of its associated cam;
   means actuated by another of said cam followers for operating said cut-off means and said hole-punch means; and
   an operating connection between still another of said cam followers and said headrail carrier raising means, whereby the latter is actuated by one of said cams on said cam shaft.

4. A Venetian blind assembly machine for cutting metal slats to length from a coil of slat stock, punching cord holes in said slats, and assembling said slats into ladder tapes depending from a pre-assembled headrail, said machine comprising:
   a vertically movable headrail carrier having means for holding a headrail in the horizontal position;
   means for raising said headrail carrier in increments equal to the vertical spacing between cross straps on said ladder tapes;

a rotatable friction wheel engaging said slat stock to drive the same along a path below said headrail and parallel thereto;

means for guiding the slat stock through said ladder tapes as the slat stock is advanced by said friction wheel;

a limit stop disposed in the path of said slat stock and engageable by the leading end thereof to stop said slat stock while the same is cut to length and cord holes are punched therein;

means on said machine for cutting said slat stock into individual slats of predetermined length, and for punching cord holes in said slats;

a pinion mounted on said friction wheel for rotation therewith;

gear means meshing with said pinion;

a motor-driven cam;

a follower riding on said cam, said follower being mounted on a pivoted lever arm; and a rod connected at one end to said lever arm, and at the other end to said gear means, whereby movement of said follower along said cam causes said friction wheel to be driven, the contour of said cam being shaped to cause said slat stock to be accelerated by said friction wheel up to a relatively high linear velocity and then decelerated down to a much slower velocity, so that the linear velocity of the slat at the moment of impact against said limit stop is below the velocity at which damage to the slat occurs.

5. A Venetian blind assembly machine for cutting metal slats to length from a coil of slat stock, punching cord holes in said slats, and assembling said slats into ladder tapes depending from a pre-assembled headrail, said machine comprising:

an upstanding frame structure having one side thereof inclined back at an angle to the vertical, said one side of said frame structure having two laterally spaced, inclined guide tracks provided thereon;

a headrail carrier mounted on said guide tracks for vertical sliding movement in the inclined plane of said one side of said frame structure, said carrier having means for holding said headrail in a horizontal position;

means for raising said headrail carrier in increments equal to the vertical spacing between cross straps on said ladder tapes;

means for advancing said slat stock horizontally across the width of said inclined one side of said frame structure below said headrail and parallel thereto;

guiding means on said frame for guiding the slat stock through said ladder tapes, said guiding means supporting said slat stock from below and having one part thereof slidably engaging the lower edge of said slat stock, the inclination of said one side of said frame structure causing a component of gravity to urge said slat stock against said one part of said guiding means;

means for holding said ladder tapes with the sides thereof spread apart to the maximum width to receive said slats between them;

means on said machine for cutting said slat stock into individual slats of predetermined length, and for punching cord holes in said slats prior to inserting the slats into said ladder tapes; and a limit stop mounted on said frame in the path of said slat stock and engageable by the leading end thereof, said limit stop serving to stop said slat stock while the same is cut to length and cord holes are punched therein.

6. A Venetian blind assembly machine for cutting metal slats to length from a coil of slat stock, punching cord holes in said slats, and assembling said slats into ladder tapes depending from a preassembled headrail, said machine comprising:

an upstanding frame structure having laterally spaced guide tracks provided thereon;

a headrail carrier mounted on said guide tracks for vertical sliding movement, said carrier having means for holding said headrail in a horizontal position;

means for raising said headrail carrier in increments equal to the vertical spacing between cross straps on said ladder tapes;

an open-sided pay-off reel support for holding a coil of slat stock, said pay-off reel support including an inclined, flat, supporting surface which is tilted back at an angle of about 15 degrees from the vertical, a shaft projecting perpendicularly from said inclined flat surface, said shaft being adapted to receive a central core upon which said coil of slat stock is wound, and the force of gravity holding said coil of slat stock against said inclined flat surface;

means for withdrawing said slat stock from said coil and advancing said slat stock horizontally across the machine below said headrail and parallel thereto;

guiding means on said frame for guiding the slat stock through said ladder tapes;

means for holding said ladder tapes with the sides thereof spread apart to receive said slats between them; and means on said machine for cutting said slat stock into individual slats of predetermined length, and for punching cord holes in said slats prior to inserting the slats into said ladder tapes.

7. A Venetian blind assembly machine for cutting metal slats to length from a coil of slat stock, punching cord holes in said slats, and assembling said slats into ladder tapes depending from a preassembled headrail, said machine comprising:

an upstanding frame structure having laterally spaced guide tracks provided thereon;

a headrail carrier mounted on said guide tracks for vertical sliding movement, said carrier having means for holding said headrail in a horizontal position;

means for raising said headrail carrier in increments equal to the vertical spacing between cross straps on said ladder tapes;

an open-sided pay-off reel support for holding a coil of slat stock, said pay-off reel support including a rotatable shaft having a member mounted perpendicularly thereon adjacent one end of the shaft, said one end of said shaft projecting from the front side of said member to receive a central core upon which said coil of slat stock is wound;

a self-aligning bearing supporting the other end of said shaft, said one end of said shaft being free to move vertically within a limited range;

a brake drum mounted on said shaft adjacent the back side of said member;

a brake shoe frictionally engaging the outer surface of said brake drum and supporting the weight carried on said one end of said shaft, whereby the braking effect exerted by said brake shoe against said brake drum is proportional to the weight of said coil;

means for withdrawing said slat stock from said coil and advancing said slat stock horizontally across the machine below said headrail and parallel thereto;

guiding means on said frame for guiding the slat stock through said ladder tapes;

means for holding said ladder tapes with the sides thereof spread apart to receive said slats between them; and means on said machine for cutting said slat stock into individual slats of predetermined length, and for punching cord holes in said slats prior to inserting the slats into said ladder tapes.

8. A Venetian blind assembly machine as described in claim 7, wherein said member mounted perpendicularly on said shaft comprises a flat plate, and the axis of said shaft is tilted up from the horizontal to an angle such that the force of gravity causes said coil of slat stock to lie flat against said flat plate.

9. A Venetian blind assembly machine as described in claim 8, wherein said upstanding frame structure has one side thereof inclined back at an angle of about 15 degrees from the vertical, said guide track being inclined to the same angle; and said pay-off reel being tilted so that the plane of said flat plate is substantially parallel to the plane of said one side of said frame structure, whereby said coil and said slat stock passing through the machine are disposed within an inclined plane;

the force of gravity causing said coil to lie against said flat plate, and also causing said slat stock to lie alongside one of said guiding means.

10. A Venetian blind assembly machine for cutting metal slats to length from a coil of slat stock, punching cord holes in said slats; and assembling said slats into ladder tapes depending from a preassembly headrail, said machine comprising:

a vertically movable headrail carrier having means for holding a pre-assembled headrail in a horizontal position;

means for raising said headrail carrier in increments equal to the vertical spacing between cross straps on said ladder tapes;

a rotatable friction wheel engaging said slat stock to drive the same along a path below said headrail and parallel thereto;

a small-diameter pinion fixedly mounted on said friction wheel for rotation therewith;

a gear of larger diameter meshing with said pinion to drive the same;

a first lever arm attached to said gear and projecting radially therefrom;

a motor-driven cam;

a follower riding on said cam, said follower being mounted on a second lever arm which is pivoted for swinging movement;

an operating rod connected at one end to said first lever arm and at the other end to said second lever arm, at least one of said connections being adjustable to vary the effective length of the lever arm;

guide means for guiding said slat stock through said ladder tapes as it is advanced by said friction wheel; and means on said machine for cutting said slat stock into individual slats of predetermined length, and for punching cord holes in said slats prior to inserting the slats into said ladder tapes.

11. The method of assembling Venetian blinds comprising the following steps:

supporting a pre-assembled Venetian blind headrail in a horizontal position with ladder tapes depending therefrom;

positioning a length of slat stock for advancement along a path below and parallel to said headrail;

accelerating said slat stock along said path, up to a relatively high linear velocity, and then decelerating said slat stock down to a much slower speed not substantially in excess of 3 feet per second;

guiding said slat stock through said ladder tapes as the slat stock is advanced along said path;

stopping said slat stock momentarily a short distance before said slat stock is fully inserted into said ladder tapes;

cutting said slat stock to predetermined slat length and simultaneously punching cord holes therein;

advancing said slat the remainder of the distance into said ladder tapes; and elevating the said headrail an increment equal to the spacing between cross straps on said ladder tapes.

12. The method of assembling Venetian blinds as described in claim 11, wherein said blind is assembled in a plane inclined at an angle from the vertical, and said slat stock is tilted as it is advanced along said path;

said slat stock being slidably engaged on the lower edge thereof by guiding means for guidance through said ladder tapes; and said slat stock being held by gravity against said guiding means.

13. The method of assembling Venetian blinds, comprising the following steps:

supporting a pre-assembled headrail in a horizontal position with depending ladder tapes and the ends of at least two lift cords projecting downwardly between corresponding ladder tapes;

elevating said headrail in increments equal to the spacing between cross straps of said ladder tapes;

advancing slat stock along a path below said headrail and parallel thereto between successive upward movements of the headrail;

guiding said slat stock through said ladder tapes as it is advanced along said path;

cutting said slat stock to predetermined slat lengths and punching cord holes therein;

inserting a bottom rail into the bottom end of said ladder tapes directly below the bottom slat;

raising the assembled blind;

positioning upwardly projecting threading needles below and in line with the cord holes in said slats and bottom rail;

lowering said blind until the top ends of said needles are between the top slat and the headrail of said blinds;

attaching the ends of said lift cords to the top ends of said needles;

pulling said lift cords down through said cord holes;

removing the ends of said cords from said needles and securing the same so that they cannot be pulled up through the cord holes in said bottom rail;

accumulating said slats against the underside of said headrail; and removing the assembled blind from its support.

14. A Venetian blind assembly machine for cutting metal slats to length from a coil of slat stock, punching cord holes in said slats, and assembling said slats into ladder tapes depending from a pre-assembled headrail, said machine comprising:

a vertically movable headrail carrier having means for holding a pre-assembled headrail in a horizontal position;

means for raising said headrail carrier in increments equal to the vertical spacing between cross straps on said ladder tapes;

a rotatable friction wheel engaging said slat stock to drive the same along a path below said headrail and parallel thereto;

guide means for guiding said slat stock through said ladder tapes as it is advanced by said friction wheel;

a cut-off die on said machine for cutting said slat stock into individual slats of predetermined length;

a pair of hole-punch dies disposed on opposite sides of said cut-off die and spaced equidistantly therefrom, for simultaneously punching cord holes in the trailing end of one slat and the leading end of the next slat;

a first cam operable to drive said friction wheel so as to advance said slat stock in one continuous movement through both ladder tapes of a 2-tape blind;

a second cam operable to drive said friction wheel so as to advance said slat stock in three separate steps through the ladder tapes of a 4-tape blind;

means for selectively driving said friction wheel by one or the other of said first and second cams;

a third cam operable to actuate both said cut-off and hole-punch dies simultaneously each time said slat stock is stopped momentarily by said first cam, or by said second cam after completing the third of said steps;

a fourth cam operable to actuate one of said hole-punch dies independently of both of said cut-off and the other of said hole-punch dies;

retractable limit stop means engageable by the leading end of said slat stock for stopping the slat stock momentarily during operation of said hole-punch and cut-off dies;

a fifth cam operable to move said limit stop means into position to engage the leading end of said slat stock, and to retract said limit stop means; and a motor driving said cams.

15. In a Venetian blind assembly machine having a frame, a vertically movable headrail carrier slidably supported on said frame, and means for cutting and punching slats and assembling the same into ladder tapes depending from a headrail supported on said carrier, the improvement comprising:

a rotatable drum;

means connected to said drum and to said headrail carrier for raising the headrail carrier when the drum is rotated in one direction;

a motor having a driving connection with said drum, said driving connection including a one-way clutch permitting the drum to turn in said one direction without driving said motor;

an intermediate member mounted coaxially with respect to said drum and rotatable relative thereto;

a friction clutch connecting said intermediate member to said drum;

a lever arm supported for swinging movement about the common axis of said drum and said intermediate member;

a driving connection between said lever arm and said intermediate member, including a second one-way clutch, whereby said intermediate member and said drum are turned in said one direction when said lever arm is rocked in that direction;

a third one-way clutch connecting said intermediate member to a stationary part of said machine in a manner to prevent said drum from turning in the other direction while said lever arm is rocking in that direction;

means for rocking said lever arm; and means for disengaging said friction clutch so as to enable said drum to turn in said other direction, whereby said headrail carrier is allowed to descend by gravity;

said drum driving said motor in reverse and thereby exerting a restraining force on said headrail carrier to slow the descent thereof.

No references cited.

RICHARD H. EANES, Jr., *Primary Examiner.*